(12) United States Patent
Droux et al.

(10) Patent No.: US 8,782,657 B2
(45) Date of Patent: Jul. 15, 2014

(54) DYNAMIC CREATION AND DESTRUCTION OF IO RESOURCES BASED ON ACTUAL LOAD AND RESOURCE AVAILABILITY

(75) Inventors: Nicolas G. Droux, Rio Rancho, NM (US); Rajagopal Kunhappan, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 291 days.

(21) Appl. No.: 13/076,720

(22) Filed: Mar. 31, 2011

(65) Prior Publication Data

US 2012/0072627 A1 Mar. 22, 2012

Related U.S. Application Data

(60) Provisional application No. 61/384,120, filed on Sep. 17, 2010.

(51) Int. Cl.
| | |
|---|---|
| *G06F 9/46* | (2006.01) |
| *G06F 15/16* | (2006.01) |
| *G06F 15/173* | (2006.01) |
| *G06F 3/00* | (2006.01) |
| *G06F 13/24* | (2006.01) |

(52) U.S. Cl.
USPC ........... 718/104; 718/105; 709/201; 709/217; 709/223; 709/227; 709/230; 710/1; 710/8; 710/20; 710/260

(58) Field of Classification Search
None
See application file for complete search history.

(56) References Cited

U.S. PATENT DOCUMENTS

| | | | | |
|---|---|---|---|---|
| 6,026,425 | A  * | 2/2000 | Suguri et al. | 718/105 |
| 6,434,656 | B1 | 8/2002 | Downer et al. | |
| 6,769,017 | B1 | 7/2004 | Bhat et al. | |
| 7,755,778 | B2 * | 7/2010 | Rai et al. | 358/1.1 |
| 7,793,301 | B2 * | 9/2010 | Bhat et al. | 719/313 |
| 2001/0016915 | A1 * | 8/2001 | Sugano et al. | 713/201 |
| 2003/0110280 | A1 * | 6/2003 | Hinchliffe et al. | 709/232 |
| 2004/0117540 | A1 * | 6/2004 | Hahn et al. | 711/100 |
| 2004/0194098 | A1 * | 9/2004 | Chung et al. | 718/100 |

(Continued)

FOREIGN PATENT DOCUMENTS

EP 0822494 A2 2/1998

OTHER PUBLICATIONS

US 6,021,479, 2/2000, Stevens (withdrawn).

(Continued)

*Primary Examiner* — Emerson Puente
*Assistant Examiner* — Adam Lee
(74) *Attorney, Agent, or Firm* — Osha Liang LLP

(57) ABSTRACT

A method for binding input/output (I/O) objects to nodes. The method includes binding an I/O object group to a NUMA node of a plurality of NUMA nodes on a system, obtaining an I/O object group size of the I/O object group, and determining an I/O object group target size based on an I/O object group aggregate load of the I/O object group. The method further includes comparing, by the NUMA I/O Framework, the I/O object group target size and the I/O object group aggregate load, determining, by the NUMA I/O Framework, that a difference between the I/O object group target size and the I/O object group aggregate load exceeds a threshold, and instructing, by the NUMA I/O Framework, an I/O Subsystem associated with the I/O object group to change the I/O object group size, wherein the I/O Subsystem changes, in response to the instruction, the I/O object group size.

17 Claims, 14 Drawing Sheets

(56) References Cited

U.S. PATENT DOCUMENTS

| | | | |
|---|---|---|---|
| 2004/0216114 A1 | 10/2004 | Lin | |
| 2005/0091383 A1* | 4/2005 | Bender et al. | 709/228 |
| 2005/0149953 A1* | 7/2005 | Limprecht et al. | 719/328 |
| 2005/0177833 A1* | 8/2005 | Sauermann | 718/105 |
| 2005/0262091 A1* | 11/2005 | Marvin et al. | 707/10 |
| 2006/0122972 A1* | 6/2006 | Keohane et al. | 707/3 |
| 2006/0206489 A1* | 9/2006 | Finnie et al. | 707/10 |
| 2008/0092138 A1 | 4/2008 | Chung et al. | |
| 2008/0216087 A1 | 9/2008 | Dillenberger et al. | |
| 2008/0294832 A1* | 11/2008 | Muppirala et al. | 710/316 |
| 2009/0187915 A1 | 7/2009 | Chew et al. | |
| 2009/0307699 A1 | 12/2009 | Munshi et al. | |
| 2009/0307704 A1* | 12/2009 | Munshi et al. | 718/104 |
| 2010/0138540 A1* | 6/2010 | Tanaka et al. | 709/226 |
| 2011/0131328 A1* | 6/2011 | Horman et al. | 709/226 |
| 2011/0276984 A1* | 11/2011 | Wagner | 719/317 |

OTHER PUBLICATIONS

International Search Report for PCT/US2011/050747 dated Nov. 24, 2011 (5 pages).

Written Opinion for International Application No. PCT/US2011/050747 dated Nov. 24, 2011 (7 pages).

Sunay Tripathi, Nicolas Droux, Thirumalai Srinivasan, Kais Belgaied "CrossBow: From Hardware Virtualized NICs to Virtualized Networks" Solaris Kernel Networking, Barcelona Spain, Aug. 17, 2009 (9 pages).

International Search Report for PCT/US2011/050746 dated Nov. 24, 2011 (5 pages).

Written Opinion for International Application No. PCT/US2011/050746 dated Nov. 24, 2011 (7 pages).

International Search Report for PCT/US2011/049852 dated Nov. 24, 2011 (5 pages).

Written Opinion for International Application No. PCT/US2011/049852 dated Nov. 24, 2011 (7 pages).

International Search Report for PCT/US2011/050748 dated Nov. 24, 2011 (5 pages).

Written Opinion for International Application No. PCT/US2011/050748 dated Nov. 24, 2011 (8 pages).

International Preliminary Report on Patentability for PCT/US2011/050746 dated Mar. 28, 2013 (7 pages).

International Preliminary Report on Patentability for PCT/US2011/050747 dated Mar. 28, 2013 (7 pages).

International Preliminary Report on Patentability for PCT/US2011/050748 dated Mar. 28, 2013 (8 pages).

International Preliminary Report on Patentability for PCT/US2011/049852 dated Mar. 28, 2013 (7 pages).

Office Action in corresponding U.S. Appl. No. 13/076,746 dated Apr. 22, 2013 (32 pages).

Office Action in corresponding U.S. Appl. No. 13/076,715 dated May 1, 2013 (31 pages).

* cited by examiner

DYNAMIC CREATION AND DESTRUCTION OF IO RESOURCES BASED ON ACTUAL LOAD AND RESOURCE AVAILABILITY

CROSS-REFERENCE TO RELATED APPLICATIONS

Pursuant to 35 U.S.C. §119 (e), this application claims benefit of U.S. Provisional Application No. 61/384,120 filed on Sep. 17, 2010, entitled "NUMA I/O Framework." The disclosure of this U.S. Provisional Application is incorporated herein by reference in its entirety.

BACKGROUND

Some modern computing system architectures utilize physically and conceptually separated nodes to leverage the speed of computing hardware. In such architectures, input/output devices may be located in various physical locations on the computer. Each input/output device may be used by different applications and processes on the separate nodes. Kernel elements executing on such architectures may be responsible for facilitating communication between an input/output device and an application which is physically remote from that device.

SUMMARY

In general, in one aspect, the invention relates to a non-transitory computer readable medium including software instructions, which when executed by a processor perform a method. The method includes binding, by a Non-Uniform Memory Access (NUMA) input/output (I/O) Framework, an I/O object group to a NUMA node of a plurality of NUMA nodes on a system, obtaining an I/O object group size of the I/O object group, and determining an I/O object group target size based on an I/O object group aggregate load of the I/O object group. The method further includes comparing, by the NUMA I/O Framework, the I/O object group target size and the I/O object group aggregate load, determining, by the NUMA I/O Framework, that a difference between the I/O object group target size and the I/O object group aggregate load exceeds a threshold, and instructing, by the NUMA I/O Framework, an I/O Subsystem associated with the I/O object group to change the I/O object group size, wherein the I/O Subsystem changes, in response to the instruction, the I/O object group size.

In general, in one aspect, the invention relates to a system which includes a plurality of Non-Uniform Memory Access (NUMA) nodes. The plurality of NUMA nodes each include a processor and a memory. The system also includes a NUMA I/O Framework executing on at least one of the plurality of NUMA nodes, configured to bind an I/O object group to the NUMA node, obtain an I/O object group size of the I/O object group, determine an I/O object group target size based on an I/O object group aggregate load of the I/O object group, and compare the I/O object group target size and the I/O object group size. The NUMA I/O Framework is also configured to send the I/O object group target size to an I/O Subsystem associated with the I/O object group in response to a determination that a difference between the I/O object group target size and the I/O object group size exceeds a threshold, and instruct the I/O Subsystem to change the I/O object group size using the I/O object group target size. The system also includes the I/O Subsystem executing on at least one of the plurality of NUMA nodes, configured to receive the I/O object group target size, receive the instruction to change the I/O object group size; and change the I/O object group size using the I/O object group target size, wherein after the changing, the I/O object group size is equal to the I/O object group target size.

In general, in one aspect, the invention relates to a method for binding input/output (I/O) objects to nodes. The method includes binding, by a Non-Uniform Memory Access (NUMA) input/output (I/O) Framework, an I/O object group to a NUMA node of a plurality of NUMA nodes on a system, wherein the I/O object group comprises a first I/O object corresponding to a thread and a second I/O object corresponding to an interrupt; obtaining an I/O object group size of the I/O object group, determining an I/O object group target size based on a first I/O object effective load of the first I/O object and a second I/O object effective load of the second I/O object; comparing, by the NUMA I/O Framework, the I/O object group target size and the I/O object group size, determining, by the NUMA I/O Framework, that a difference between the I/O object group target size and the I/O object group size exceeds a threshold, and instructing, by the NUMA I/O Framework, a Network Media Access Connection (MAC) Layer associated with the I/O object group to change the I/O object group size, wherein the Network MAC Layer changes, in response to the instruction, the I/O object group size.

DETAILED DESCRIPTION

Figure 1:
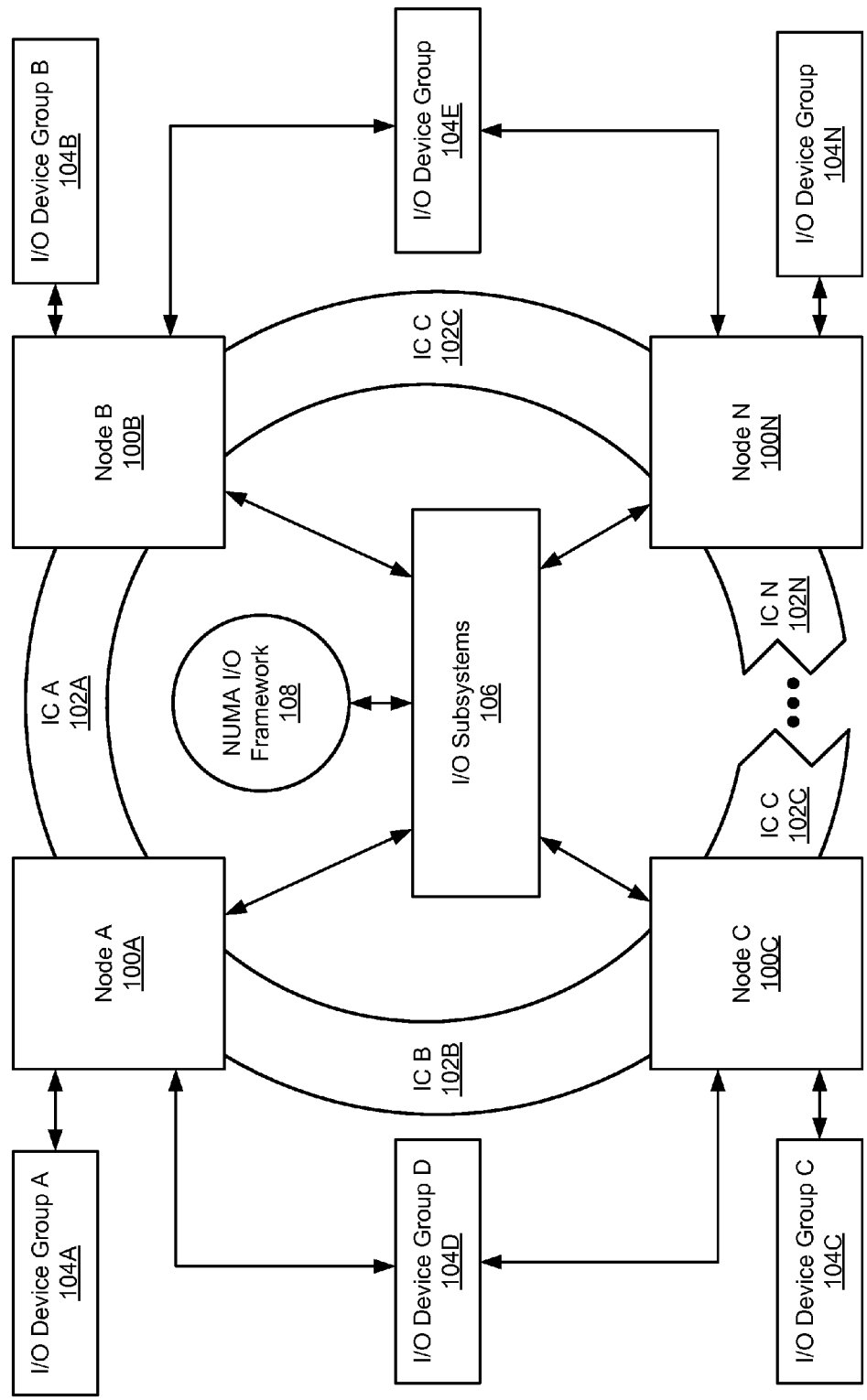
FIG. 1 shows a system in accordance with one or more embodiments of the invention.

Exemplary embodiments of the invention will be described with reference to the accompanying drawings. Like items in the drawings are shown with the same reference numbers. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a framework for managing input/output (I/O) resources on a system with a non-uniform memory access (NUMA) architecture. More specifically, embodiments of the invention relate to a method and system for dynamically placing and reassigning I/O resources to NUMA nodes.

FIG. 1 shows a system in accordance with one embodiment of the invention. As shown in FIG. 1, the system includes Node A (100A), Node B (100B), Node C (100C), and Node N (100N). Each Node (Node A (100A), Node B (100B), Node C (100C), and Node N (100N)) is operatively connected to one or more other Nodes via an interconnect (IC) (IC A (102A), IC B (102B), IC C (102C), IC N (102N)). Each Node (Node A (100A), Node B (100B), Node C (100C), and Node N (100N)) is also operatively connected to one or more I/O Device Groups (I/O Device Group A (104A), I/O Device Group D (104D), I/O Device Group C (104C), I/O Device Group B (104B), I/O Device Group E (104E), I/O Device Group N (104N)) (see FIG. 3). The system further includes I/O Subsystems (106) and NUMA I/O Framework (108). In one or more embodiments of the invention, the system architecture depicted in FIG. 1 may operate as a system with NUMA architecture. In one or more embodiments of the invention, the ICs (IC A (102A), IC B (102B), IC C (102C), IC N (102N)) may be implemented as a computer bus or data link capable of transferring data between nodes on a NUMA architecture system.

In one or more embodiments of the invention, I/O Subsystems (106) (also referred to as I/O Frameworks) provide an abstraction layer between system processes and the various system I/O functions. Specifically, I/O Subsystems (106) may exercise an amount of control over how the software entities utilizing the framework communicate with each other, and may include mechanisms to further other system goals (e.g., power management, consumer priority, etc.). Examples of I/O Subsystems (e.g., I/O Subsystems (106)) include, but are not limited to, a storage stack, InfiniBand ULP (InfiniBand is a registered trademark of the InfiniBand Trade Association), and a Network MAC Layer.

In one or more embodiments of the invention, each I/O Subsystem receives requests from other software entities to use or access its associated I/O device. In one or more embodiments of the invention, each I/O Subsystem includes the functionality to manage the I/O resources necessary to service the requests. The I/O managed resources may include, for example, threads, interrupts, and software receive rings. In addition, the I/O Subsystems (106) may manage its associated resources by initializing an I/O Object corresponding to the managed resource. (see FIG. 8). Further, the I/O resources managed by one or more I/O Subsystems (106) may exist or execute on a single Node (e.g. Node A (100A)), on multiple Nodes (e.g. Node A (100A) and Node B (100B)), or on all Nodes within a single system. Each of the I/O Subsystems (106) may also execute on a single Node (e.g. Node A (100A)), on multiple Nodes (e.g. Node A (100A) and Node B (100B)), or on all Nodes within a single system. Accordingly, the I/O Subsystems (106) and the NUMA I/O Framework (108) are depicted in FIG. 1 as external to the other elements on the system for illustrative purposes.

In one or more embodiments of the invention, the NUMA I/O Framework (108) is an abstraction layer between the I/O Subsystems (106) and the underlying NUMA architecture (e.g., the system depicted in FIG. 1). The NUMA I/O Framework (108) assumes all responsibility for determining where and how I/O Objects (e.g., references to I/O resources) are processed. Specifically, the NUMA I/O Framework manages the physical location of the I/O resources managed by the I/O Subsystems (106). In one or more embodiments of the invention, the NUMA I/O Framework determines the placement of an I/O Object using information-gathering modules or policies implemented to further system goals (see FIGS. 4-7).

In one or more embodiments of the invention, the NUMA I/O Framework (108) binds the I/O resource to one or more nodes on the system. Binding an I/O resource to a node may include notifying a kernel scheduler that the instructions associated with the I/O resource are to be executed on the node or nodes to which it is bound. In one or more embodiments of the invention, once an I/O resource is bound to a node or nodes (e.g., via an I/O Object), the instructions or messages originating from that I/O resource are scheduled for execution on the node to which it is bound until there is further intervention by the NUMA I/O Framework (108). In one embodiment of the invention, an I/O resource may be bound to a subset of nodes (e.g., via an I/O Object). The NUMA I/O Framework (108) may provide the kernel scheduler information about the subset of nodes as part of binding the I/O resource. The kernel scheduler may then chose which one of the subset of nodes on which the instructions or messages are scheduled for execution.

Figure 2:
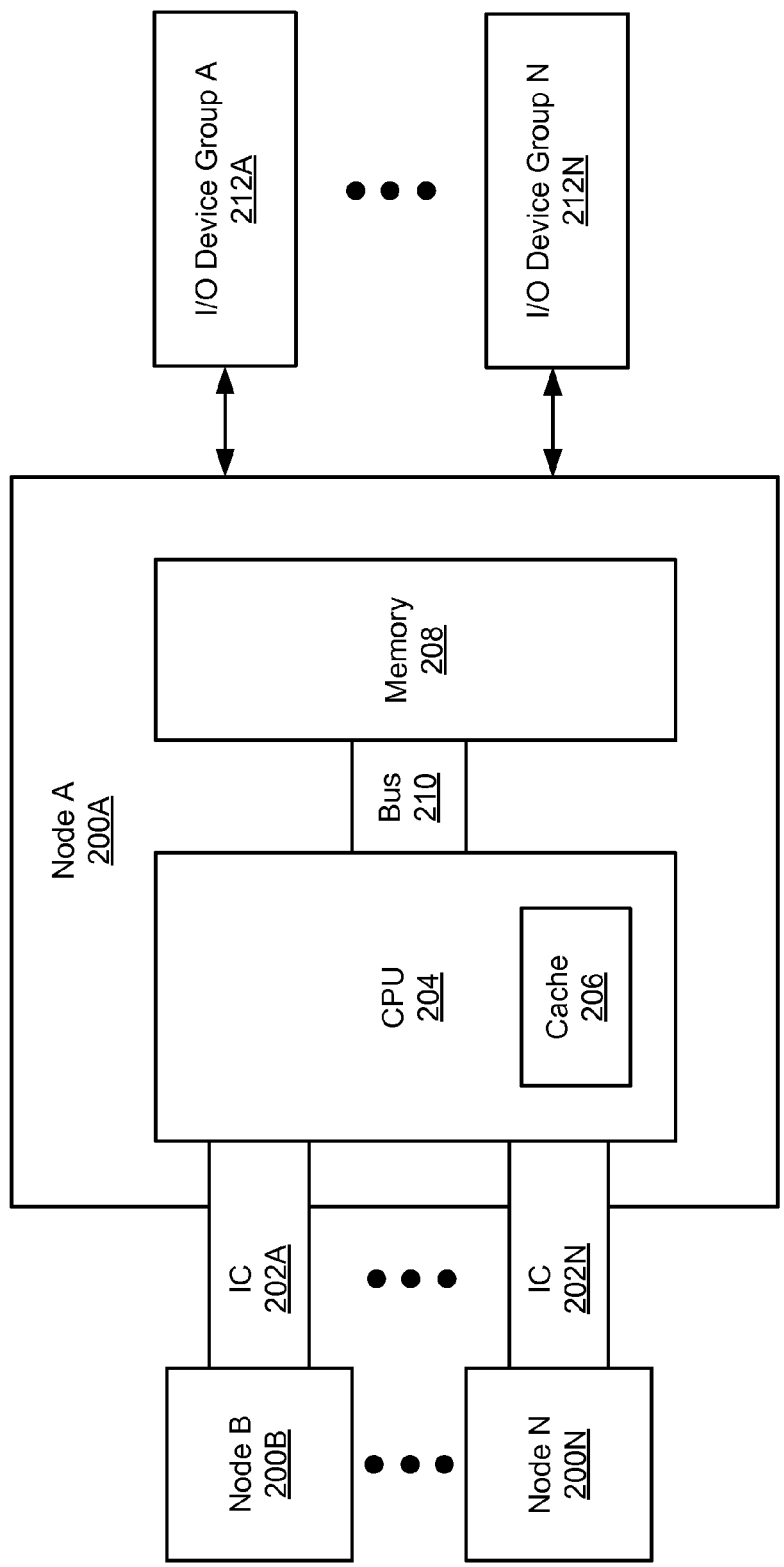
FIG. 2 shows a NUMA node in accordance with one or more embodiments of the invention.

FIG. 2 shows a node in accordance with one embodiment of the invention. As shown in FIG. 2, Node A (200A) is operatively connected to Node B (200B) and Node N (200N) via the ICs (IC A (202A), IC N (202N)). Node A (200A) includes a central processing unit (CPU) (204) and Cache (206) connected to a memory (208), via a Bus (210). Each of the other nodes in the system (Node B (200B), Node N (200C)) may include substantially similar elements as those depicted in Node A (200A).

In one or more embodiments of the invention, the memory (208) includes local application memory and local kernel memory. A portion of the local kernel memory may be allocated for use by system-wide software elements (e.g., I/O Subsystems, NUMA I/O Framework, etc.). In one embodiment of the invention, the memory (208) is under the control of a memory manager specific to the CPU (204) on Node A (200A), and the memory of Node B (200B) (not shown) is under the control of a memory manager specific to the CPU of Node B (200B) (not shown). Said another way, the above-described architecture may operate more efficiently than an architecture where all CPUs are competing for memory from a single memory manager. Other embodiments of the invention may be implemented on system architectures other than those described above.

In one or more embodiments of the invention, processes and other instruction sets executed on Node A (200A) using the CPU (204) and memory (208) may be received with varying frequency. For example, if a node has the ability to process 10 instructions per second, but is receiving only 5 instructions every second, then the node is said to be under-utilized. If the same node instead receives 12 instructions every second, then the node is said to be over-utilized. A node's I/O load capacity refers to the quantification of the amount of additional instructions that the node can process without become over-utilized (e.g., an under-utilized node would have a high I/O load capacity relative to the total processing ability of the node).

In one or more embodiments of the invention, each node (Node A (200A), Node B (200B), Node N (200B)) may be operatively connected to one or more I/O Device Groups. As depicted in FIG. 2, Node A (200A) is operatively connected to one or more I/O Device Groups (IO Device Group A (212A), I/O Device Group N (212N)). In one embodiment of the invention, one or more of the I/O Device Groups (e.g., I/O Device Group A (212A), I/O Device Group N (212N)) may be connected to one or more nodes via an IC.

In one or more embodiments of the invention, a NUMA node may include a CPU (e.g., CPU (204)), and not include memory. Alternatively, in one embodiment of the invention, a NUMA node may include a memory (e.g., memory (208)) but not include a CPU.

Figure 3:
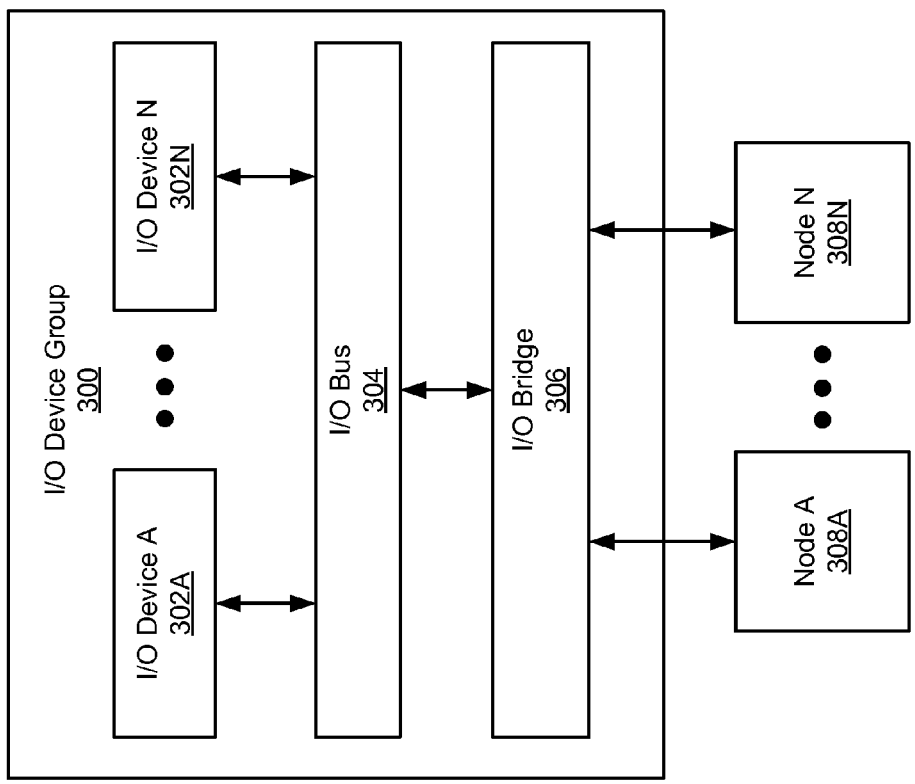
FIG. 3 shows an I/O Device Group in accordance with one or more embodiments of the invention.

FIG. 3 shows an I/O Device Group in accordance with one embodiment of the invention. As shown in FIG. 3, the I/O Device Group (300) includes one or more I/O devices (IO Device A (302A), I/O Device N (302N)) operatively connected to I/O Bus (304), which is, in turn, operatively connected to I/O Bridge (306). I/O Bridge (306) is operatively connected to one or more nodes (Node A (308A), Node N (308N)) (e.g., Node A (100A) in FIG. 1).

In one embodiment of the invention, the I/O devices (IO Device A (302A), I/O Device N (302N)) refer to resources connected to the computer system, which may be used by programs executing on the system for information input and/or information output. Examples of such devices may include, but are not limited to, disk drives, network interface cards, printers, Universal Serial Buses (USBs), etc. One of ordinary skill in the art will appreciate there are other I/O devices not listed here.

Figure 4:
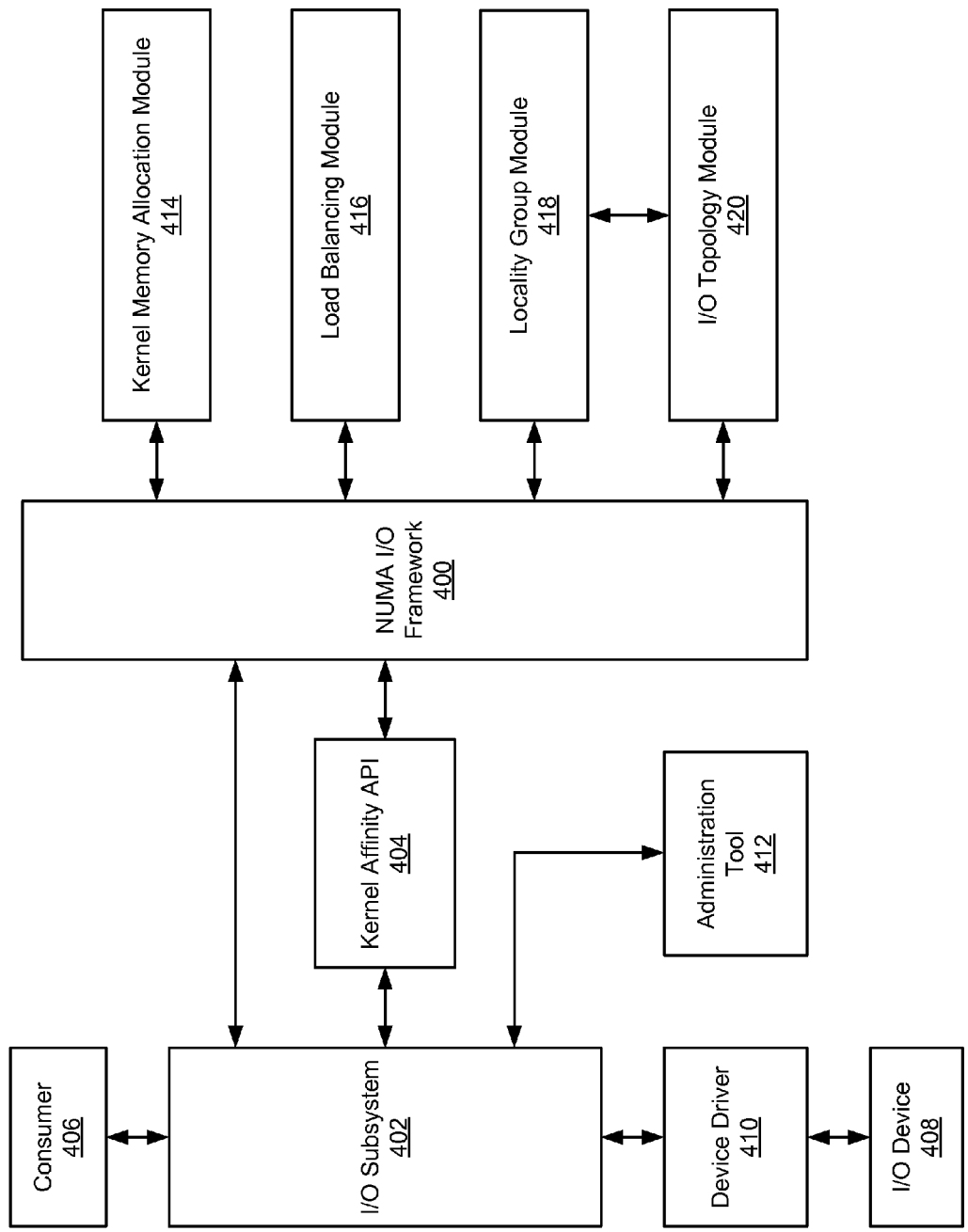
FIG. 4 shows a system in accordance with one or more embodiments of the invention.

FIG. 4 shows a system in accordance with one embodiment of the invention. Specifically, FIG. 4 shows the interaction between software entities executing on one or more nodes (e.g., Node A (200A), Node B (200B), and Node N (200N) in FIG. 1) of a system in accordance with one embodiment of the invention. As shown in FIG. 4, the system includes the NUMA I/O Framework (400), which communicates with the I/O Subsystem (402) directly, or via the Kernel Affinity API (404). The I/O Subsystem (402) facilitates communication between the Consumer (406) and the I/O Device (408) (via the Device Driver (410)). The I/O Subsystem may also receive I/O Object constrains or restriction information from the Administration Tool (412).

In one or more embodiments of the invention, the NUMA I/O Framework (400) utilizes a number of specialized modules to perform specific tasks and gather information. These modules include the NUMA Kernel Memory Allocation Module (414), the I/O Load Balancing Module (416), the NUMA Locality Group Module (418), and the I/O Topology Module (420). Each of these elements is described in detail below.

In one or more embodiments of the invention, the Consumers (Consumer (406)) refer to processes and programs which utilize or attempt to utilize the I/O resources of the system. Consumers may operate at the kernel level (e.g., as part of the operating system) or may operate at the user level (e.g., as part of an application). The I/O resources may include I/O Devices (e.g., I/O Device (408)), processing resources (e.g., CPU (204) and memory (208) in FIG. 2), as well as other system elements which facilitate communication between a process and an I/O Device (e.g., interrupts, receive rings, listeners, etc.), and may include physical or virtual elements.

In one or more embodiments of the invention, the I/O Subsystem (402) manages the I/O resources necessary to service requests to access the I/O Device (408) received from a Consumer (406). Such requests may include calls to open a connection to the I/O Device (408), or to establish a data link via the appropriate I/O Subsystem (402). The I/O Subsystem (402) may also include the functionality to initialize or instantiate an I/O Object, and associate the I/O Object with an I/O resource. Specifically, the I/O Subsystem (402) may create an I/O Object which includes a reference to an I/O resource, which may then be provided to the NUMA I/O Framework (400) as part of a request to bind an I/O resource (see FIG. 8). In one embodiment of the invention, multiple I/O Objects may reference a single resource or a set of resources, and conversely, a single I/O resource or set of I/O resources may correspond to multiple I/O Objects.

In one embodiment of the invention, the NUMA I/O Framework (400) receives I/O Objects from the I/O Subsystem (402). The I/O Objects may be received via the Kernel Affinity API (404), which provides an interface for the I/O Subsystem (402) to register I/O Objects with the NUMA I/O Framework (400). Further, I/O Objects registered with the NUMA I/O Framework (400) may include information regarding the grouping of the I/O Objects, an affinity between the I/O Objects, and any constraints associated with the I/O Objects. The NUMA I/O Framework (400) uses the affinity to determine an appropriate node or nodes to an I/O Object should be bound. (e.g., nodes that are physically close to one another, a nodes that are physically close to an specified I/O Device, etc.). In one or more embodiments of the invention, I/O Objects are sent to the NUMA I/O Framework (400) in one or more I/O Object Groups (see FIG. 8).

In one embodiment of the invention, the NUMA I/O Framework (400) binds the I/O Objects to nodes. In one embodiment of the invention, binding an I/O Object refers to assigning the tasks issued by the I/O resource referenced by the I/O Object (e.g., handling an interrupt, executing a thread) to one or more nodes on the system. In one or more embodiments of the invention, the NUMA I/O Framework (400) uses the information within the I/O Object (e.g., affinity), along with information from and functionality of other modules on system to accomplish the binding The Load Balancing Module (416), the Locality Group Module (418), and the I/O Topology Module (420) are discussed below with regard to FIGS. 5, 6, and 7, respectively. In one embodiment of the invention, the NUMA I/O Framework (400) may bind I/O Objects according to one or more objectives. For example, the NUMA I/O Framework (400) may bind I/O Objects in order to maximize the performance of the entire system. Alternatively, the NUMA I/O Framework (400) may bind I/O Objects in a manner which makes the most efficient use of system resources. The NUMA I/O Framework (400) may also bind I/O Objects to maximize the speed at which one or all processes are executed. The NUMA I/O Framework (400) may bind I/O Objects in a manner which minimizes the distance between the I/O Devices being used, and the Node bound to the associated I/O Objects.

In one or more embodiments of the invention, Kernel Memory Allocation Module (414) allows the NUMA I/O Framework (400) to allocate kernel memory from any of the attached nodes (e.g., from memory (208) in Node A (200A) in FIG. 2). In one embodiment of the invention, the Load Balancing Module (416) monitors the amount of work performed by each node. This information is used by the NUMA I/O Framework to dynamically balance the work between nodes, taking into account resource management and I/O Topology (i.e., the location of the nodes relative to one another). In one embodiment of the invention, the amount of work or rate of processing done by a system node is referred to as the node's I/O load.

Figure 5:
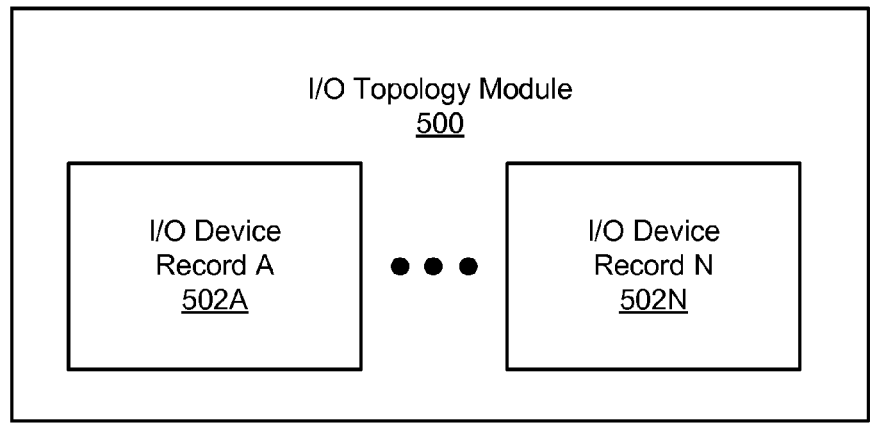
FIG. 5 shows an I/O Topology Module in accordance with one or more embodiments of the invention.

FIG. 5 shows an I/O Topology Module in accordance with one embodiment of the invention. As shown in FIG. 5, the I/O Topology Module (500) includes one or more I/O Device Records (I/O Device Record A (502A), I/O Device Record N (502N)). The I/O Topology Module (500) uses information gathered from the I/O Subsystems (e.g., I/O Subsystem (402) in FIG. 4) to create an I/O Device Record for each I/O Device on the system (e.g., I/O Device (408) in FIG. 4). Each I/O Device Record (e.g., I/O Device Record A (502A), I/O Device Record N (502N)) includes information indicating which system nodes are directly connected to the I/O Device. Alternatively, in one or more embodiments of the invention, the I/O Device Record is created and maintained by other kernel elements on the system accessible by the I/O Topology Module (500). Information regarding the location of each I/O Device on the system may be referred to as the I/O Topology.

In one or more embodiments of the invention, the I/O Topology Module (500) includes the functionality to respond to queries by the NUMA I/O Framework such that for a given I/O Device, the I/O Topology Module (500) returns the node or nodes directly connected to that I/O Device. In one embodiment of the invention, these nodes are referred to as the Preferred Nodes.

Figure 6:
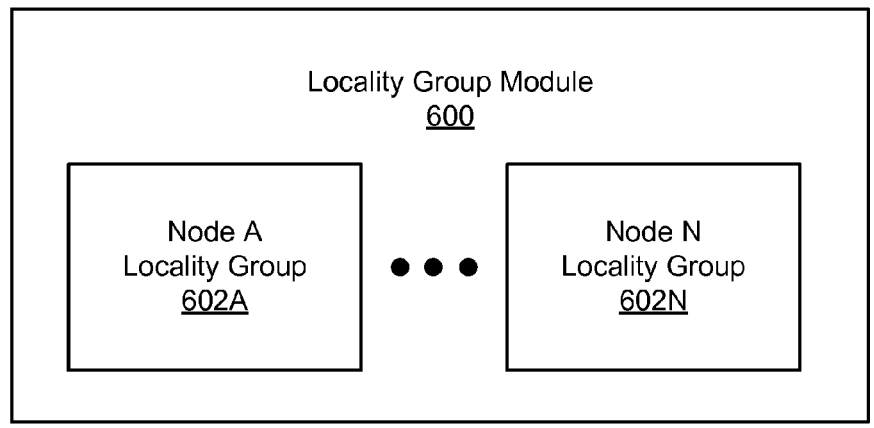
FIG. 6 shows a Locality Group Module in accordance with one or more embodiments of the invention.

FIG. 6 shows a Locality Group Module in accordance with one embodiment of the invention. As shown in FIG. 6, the Locality Group Module (600) includes one or more Locality Groups (e.g., Node A Locality Group (602A), Node N Locality Group (602N)). Each Locality Group maintains information about a node on the system. This information may include the location of the node relative to the other nodes on the system (i.e., which nodes are directly adjacent to the node). Information regarding the location of each node on the system may be referred to as the NUMA Topology. In one embodiment of the invention, the distance between Nodes or I/O Devices refers to the physical distance between the two elements. In one embodiment of the invention, the distance may refer to the number of Nodes between the two elements (also referred to as hops). Further, in one embodiment of the invention, the distance between nodes may be expressed in terms of the time necessary for data to travel from one node to another (also referred to as the latency between nodes).

In one or more embodiments of the invention, the Locality Group Module (600) includes the functionality to respond to queries by the NUMA I/O Framework such that for a given Node, the Locality Group Module (600) returns the node or nodes directly connected to that Node. In one embodiment of the invention, these nodes are referred to as the Preferred Nodes.

Figure 7:
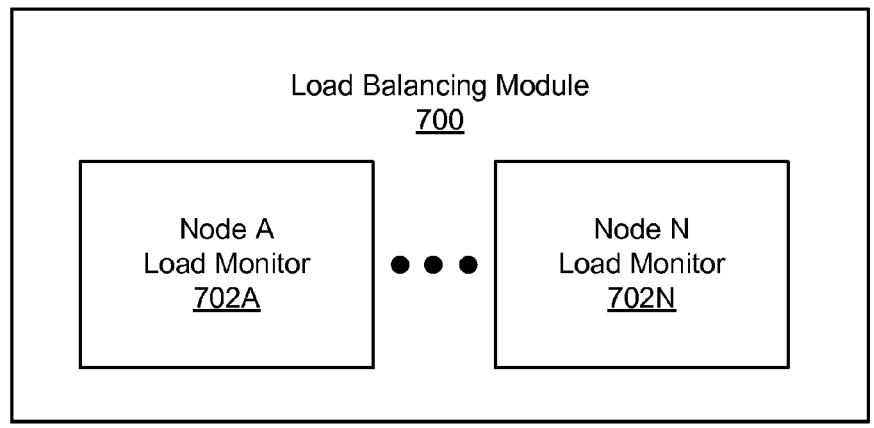
FIG. 7 shows a Load Balancing Module in accordance with one or more embodiments of the invention.

FIG. 7 shows a Load Balancing Module in accordance with one embodiment of the invention. As shown in FIG. 7, the Load Balancing Module (700) includes one or more Load Monitors (e.g., Node A Load Monitor (702A), Node N Load Monitor (702N)). Each Load Monitor (e.g., Node A Load Monitor (702A), Node N Load Monitor (702N)) maintains information about the utilization and I/O load capacity of the corresponding node. (e.g., CPU utilization, memory utilization, etc.). Specifically, each Load Monitor (e.g., Node A Load Monitor (702A), Node N Load Monitor (702N)) obtains periodic measurements of specified metrics (e.g., CPU utilization, memory utilization, etc.), and uses the measurements to calculate an I/O load for the node. In one embodiment of the invention, the I/O load includes indicators reflective of trending direction of the measured metrics (e.g., increasing CPU utilization over the last 10 cycles). Further, in one embodiment of the invention, each Load Monitor (e.g., Node A Load Monitor (702A), Node N Load Monitor (702N)) includes functionality to track metrics over time and detect patterns in the I/O load (e.g., CPU utilization is greatest on Monday afternoons between 2 pm and 5 pm). The I/O load is also used to calculate a node I/O load capacity.

Figure 8:
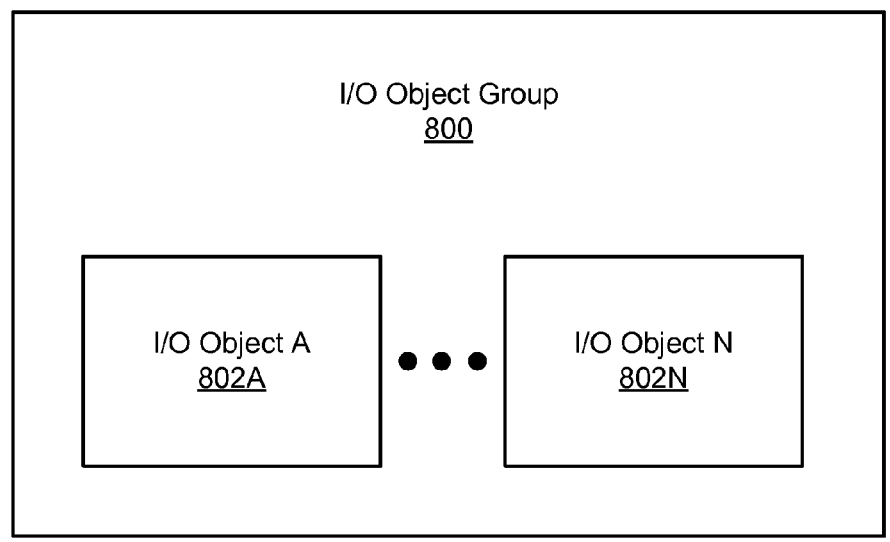
FIG. 8 shows an I/O Object Group in accordance with one or more embodiments of the invention.

FIG. 8 shows an I/O Object Group in accordance with one embodiment of the invention. As shown in FIG. 8 the I/O Object Group (800) includes one or more I/O Objects (e.g., I/O Object A (802A), I/O Object N (802N)). In one or more embodiments of the invention, an I/O Object is a software construct which encapsulates a reference or handle to a corresponding I/O resource. Each I/O Object may also include one or more affinities with other I/O Objects, a constraint on the binding of the I/O object, and a Dedicate CPU Flag.

In one or more embodiments of the invention, an affinity is a scalar indication of the strength of the relationship between I/O Objects (e.g., no relationship, weak relationship, strong relationship, negative relationship, etc.). The affinity between two I/O Objects (I/O Object A (802A), I/O Object N (802N)) defines the maximum or minimum permitted distance between the nodes to which the I/O Objects may or should be bound. In one or more embodiments of the invention, the affinity is specified by the I/O Subsystem managing the I/O Object.

In one or more embodiments of the invention, the I/O Subsystem creates an affinity between I/O Objects (e.g., I/O Object A (802A), I/O Object N (802N)) corresponding to I/O resources which work together to perform part of an I/O operation. For example, an I/O Object corresponding to an interrupt for traffic received by a virtual network interface card may have a strong affinity to other I/O Objects corresponding to other interrupts and threads processing data on the same virtual network interface card.

In one or more embodiments of the invention, a constraint may specify a node or group of nodes upon which an I/O Object or I/O Object Group must be bound. A constraint may be used to confine an I/O Object or I/O Object Group to an approved or appropriate set of nodes. Constraints may be used to isolate one I/O Object or I/O Object Group from another. In one or more embodiments of the invention, constraints may be used by the I/O Subsystem to enforce the separation of zones or containers on a system.

In one or more embodiments of the invention, a Dedicate CPU Flag may indicate that the I/O Object should be bound to a node with a CPU available to dedicate to the I/O Object. The Dedicate CPU Flag may be interpreted by the NUMA I/O Framework as an absolute restriction, or alternatively as a preference. In one embodiment of the invention, the Dedicate CPU Flag may include other information indicating a strength of the preference.

In one or more embodiments of the invention, the I/O Object includes information related to I/O load produced by the I/O resource associated with the I/O Object. Specifically, the I/O Object may include a value which represents the expected I/O load that will be imposed upon the node to which the I/O Object is bound. Alternatively, the I/O Object may include information which allows the NUMA I/O Framework to obtain the I/O load associated with the I/O Object from elsewhere on the system. Further, once the I/O object is bound to a node, and the load caused by the I/O object on that node is measured. In one or more embodiments of the invention, the measured I/O load of an I/O Object is referred to as the effective I/O load or I/O object effective load. The measurement may be used to update the value representing the expected I/O load of the I/O object. In one embodiment of the invention, once the I/O object is bound, measurements are made periodically and the measurements are used to update the expected I/O load of the I/O object.

In one or more embodiments of the invention, I/O Objects may be submitted to the NUMA I/O Framework as an I/O Object Group (800). An I/O Object Group (800) may include affinities or constraints that apply to all I/O Objects within the I/O Object Group (800). In addition, in one embodiment of the invention, the NUMA I/O Framework may apply affinities or constraints inherent to all I/O Objects within an I/O Object Group (800).

In one or more embodiments of the invention, multiple I/O Objects in an I/O Object Group (800) refer to the same I/O resource or set of I/O resources. In one embodiment of the invention, using multiple I/O Objects associated with a single I/O resource or set of I/O resources allows an I/O Object Group (800) to contain multiple sets of I/O resources or combinations of sets of I/O resources.

Figure 9:
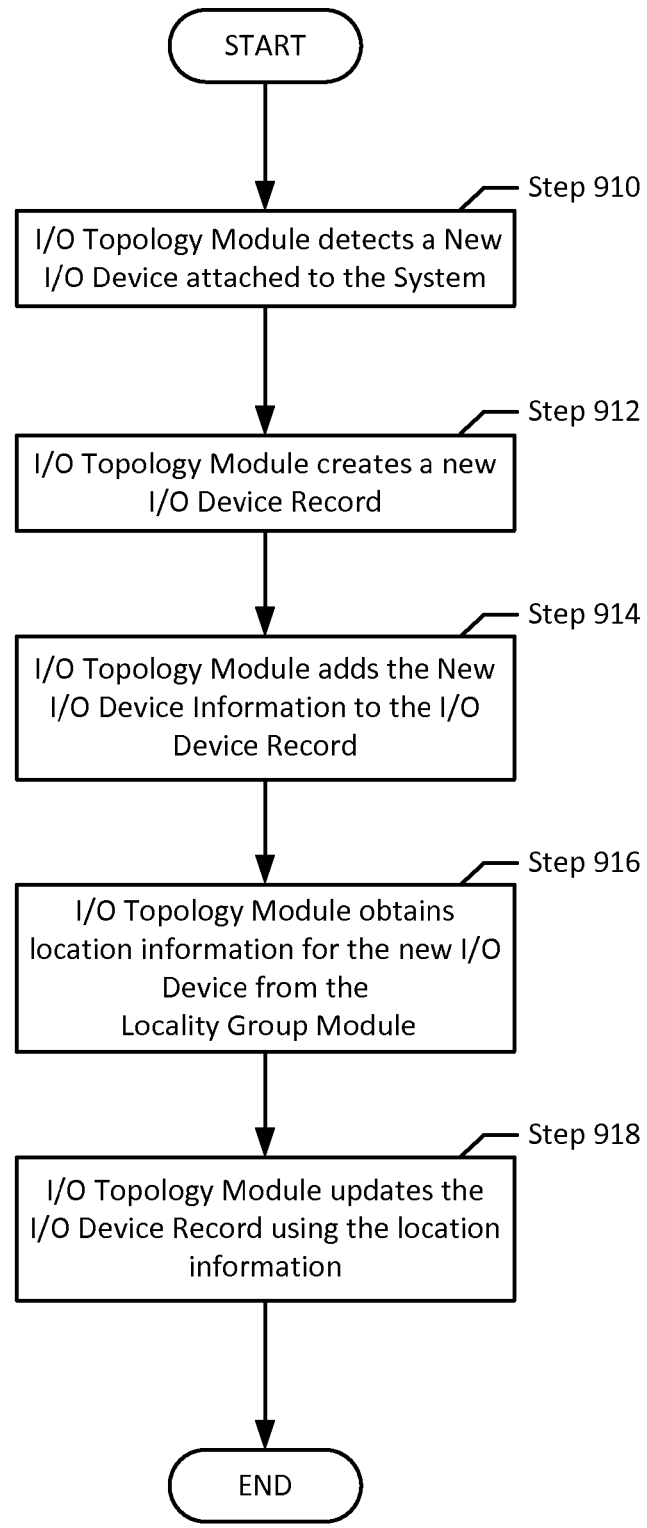
FIG. 9 shows a flowchart in accordance with one or more embodiments of the invention.

FIG. 9 shows a flow chart for registering a new I/O Device with a NUMA I/O Framework in accordance with one or more embodiments of the invention. In one or more embodiments of the invention, one or more of the steps shown in FIG. 9 may be omitted, repeated, and/or performed in a different order than that shown in FIG. 9. Accordingly, the specific arrangement of steps shown in FIG. 9 should not be construed as limiting the scope of the invention.

In Step 910, the I/O Topology Module detects the attachment of a new I/O Device to the system. In Step 912, the I/O Topology Module creates a new I/O Device Record. In Step 914, the I/O Topology Module adds the new I/O Device information to the I/O Device Record. In Step 916, the I/O Topology Module obtains location information for the new I/O Device from the Locality Group Module, or from other system resources (e.g., BIOS, machine description, etc.). This information may include the closest nodes to the I/O Device, which are not directly connected to the I/O Device. In Step 918, the I/O Topology Module updates the I/O Device Record using the location information obtained from the Locality Group Module.

Figure 10:
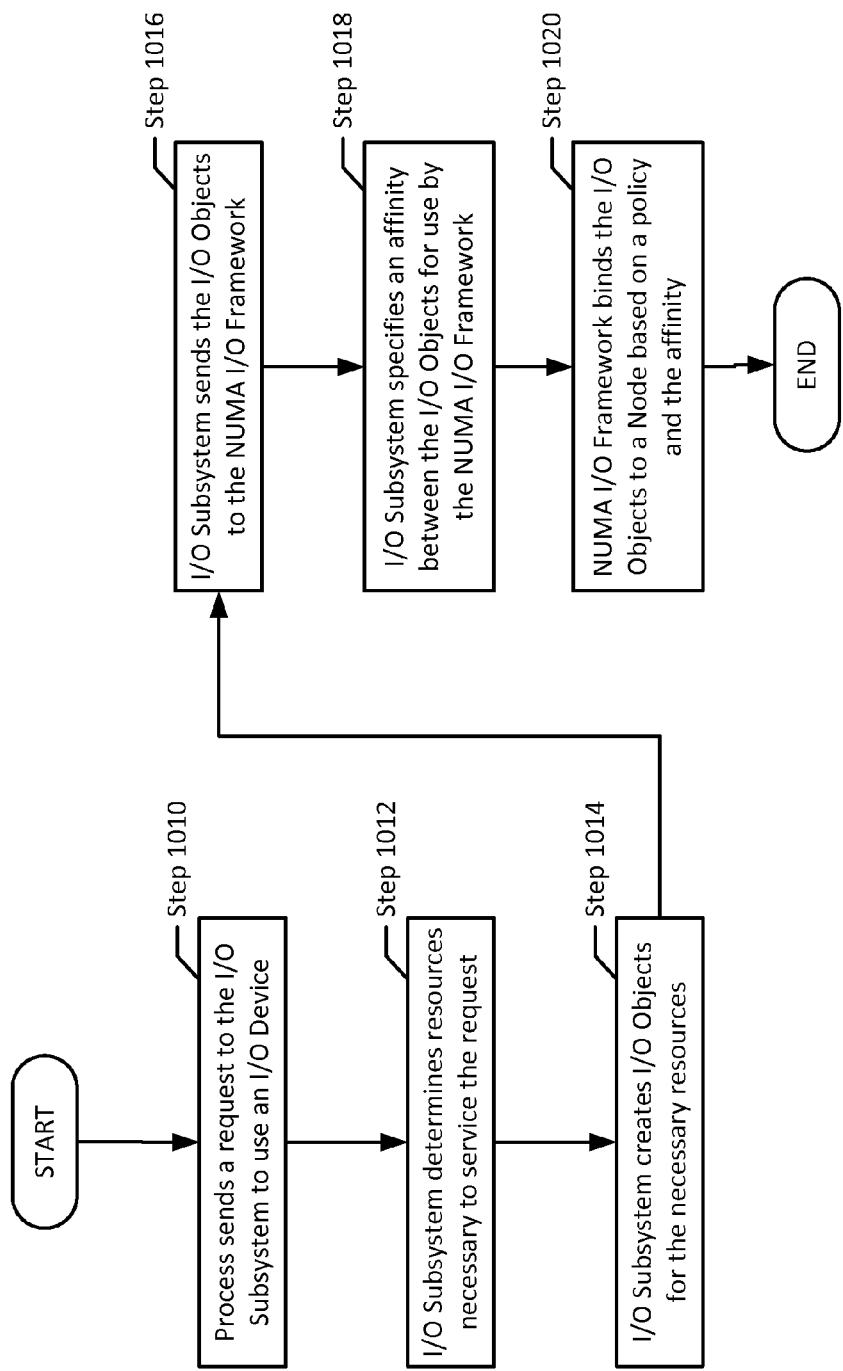
FIG. 10 shows a flowchart in accordance with one or more embodiments of the invention.

FIG. 10 shows a flow chart for servicing a request by an I/O Subsystem in accordance with one or more embodiments of the invention. In one or more embodiments of the invention, one or more of the steps shown in FIG. 10 may be omitted, repeated, and/or performed in a different order than that shown in FIG. 10. Accordingly, the specific arrangement of steps shown in FIG. 10 should not be construed as limiting the scope of the invention.

In Step 1010, a process sends a request to the I/O Subsystem to use an I/O Device. The request may be, for example, a request to create a data link associated with a network interface card so that other processes may transmit data across a network. Alternatively, the request may be to gain access to a storage device in order to alter data located on that device. Other examples of incoming requests include requests from a network stack (e.g., to create a VNIC), and requests from a file system. In Step 1012, the I/O Subsystem determines resources necessary to service the request. This may include, for example, a specific number of threads and a specific number of interrupts. In one embodiment of the invention, this determination is based on the requirements of similar requests previously serviced. In one embodiment of the invention, the determined resources may change over time as usage information is analyzed.

For example, an I/O Subsystem which creates a connection between a process and a physical network, may be configured to create a specified number of I/O Objects for threads, and a specified number of I/O Objects for interrupts for connections of the type created. The I/O Subsystem may further be configured to specify that the threads should not execute on separate nodes, because doing so may cause an unacceptable amount of slowness or data loss for the connection. For this reason, the I/O Subsystem may express this by specifying a strong affinity between the I/O Objects.

In Step 1014, the I/O Subsystem creates I/O Objects for the necessary resources. In Step 1016, the I/O Subsystem sends the I/O Objects to the NUMA I/O Framework. In one embodiment of the invention, the I/O Objects are created by invoking method call of the Affinity Kernel API. In Step 1018, the I/O Subsystem specifies an affinity between the I/O Objects for use by the NUMA I/O Framework. In Step 1020, the NUMA I/O Framework binds the I/O Objects to a node based on a policy and the affinity. Step 1020 is explained in detail with regard to FIGS. 10 and 11.

Figure 11:
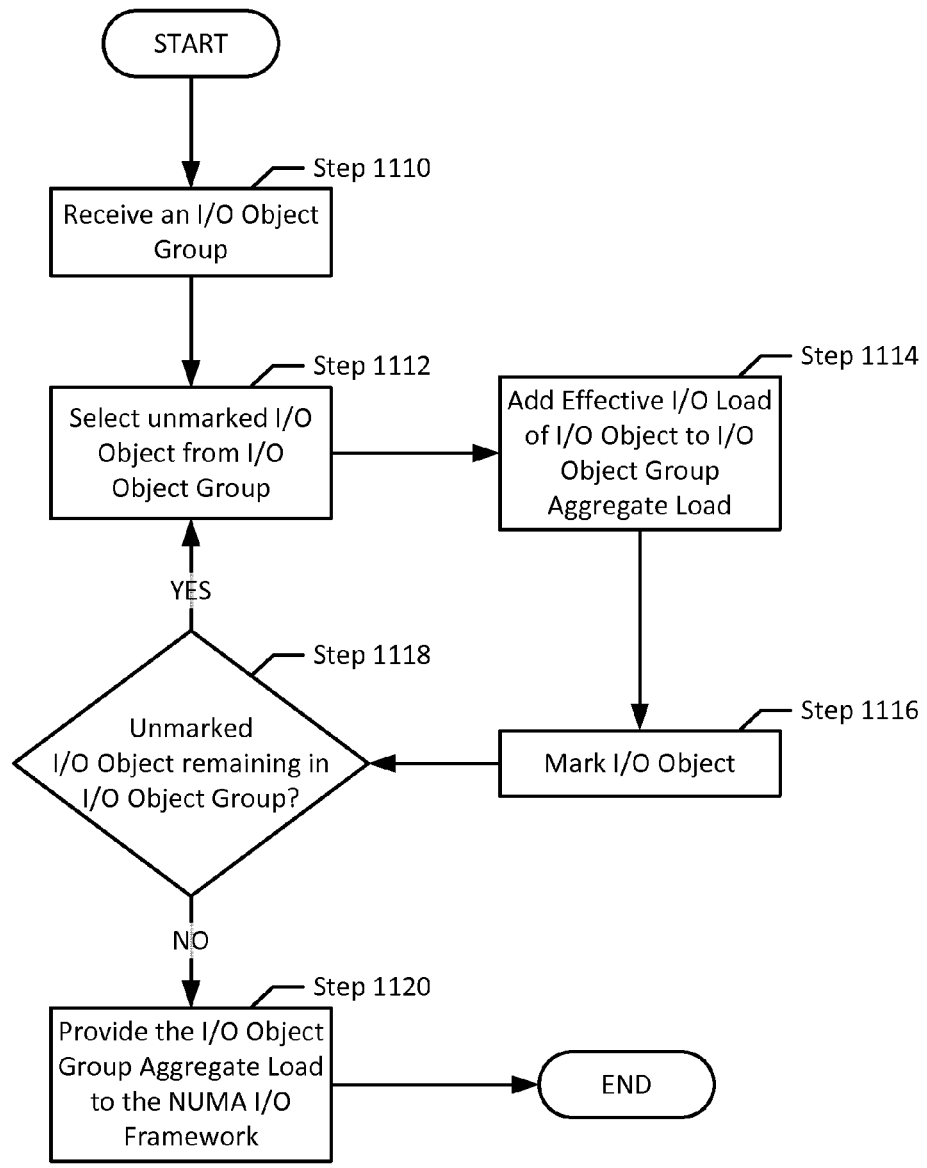
FIG. 11 shows a flowchart in accordance with one or more embodiments of the invention.

FIG. 11 shows a flow chart for determining the I/O Object Group Aggregate Load in accordance with one or more embodiments of the invention. In one or more embodiments of the invention, one or more of the steps shown in FIG. 11 may be omitted, repeated, and/or performed in a different order than that shown in FIG. 11. Accordingly, the specific arrangement of steps shown in FIG. 11 should not be construed as limiting the scope of the invention.

Although the steps discussed in regard to FIG. 11 are described as being performed by the Load Balancing Module, in one embodiment of the invention, the steps may be performed by the NUMA I/O Framework directly. In Step 1110, the Load Balancing Module receives an I/O Object Group. In Step 1112, the NUMA I/O Framework selects a first I/O Object such that the expected I/O load associated with the I/O Object has not yet been added to the I/O Object Group Aggregate Load (referred to as an unmarked I/O Object). In Step 1114, the expected I/O load of the selected I/O Object is added to the I/O Object Group Aggregate Load. In Step 1116, the selected I/O Object is marked. In one embodiment of the invention, the I/O Object is marked so that its expected I/O load will not be added to the I/O Object Group Aggregate Load more than once.

In Step 1118, the Load Balancing Module determines if any unmarked I/O Objects remain in the I/O Object Group. If at least one unmarked I/O Object remains in the I/O Object Group, the flow returns to Step 1112. If no unmarked I/O Objects remain in the I/O Object Group, then in Step 1120, Load Balancing Module provides the I/O Object Group Aggregate Load to the NUMA I/O Framework.

Figure 12:
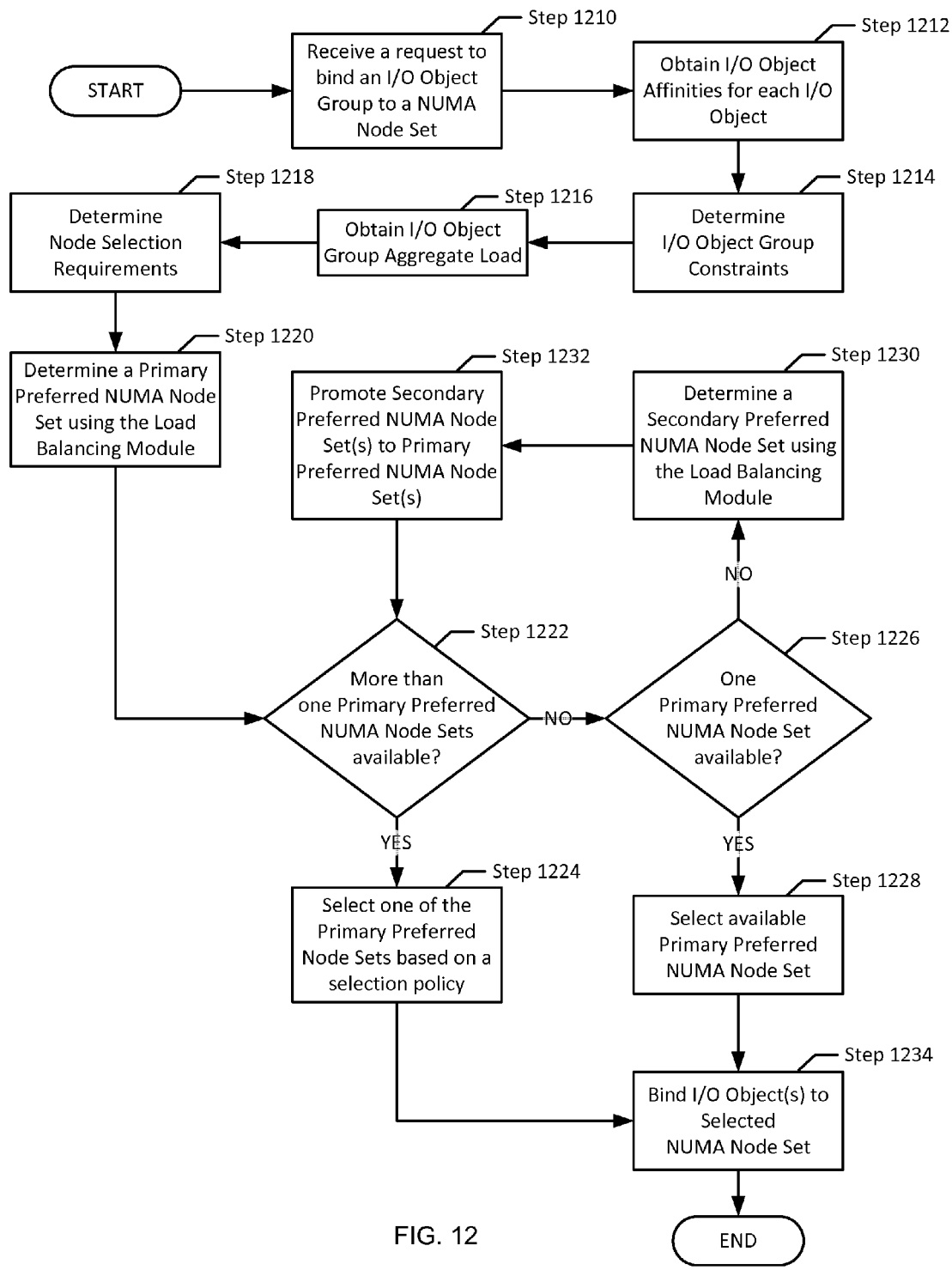
FIG. 12 shows a flowchart in accordance with one or more embodiments of the invention.

FIG. 12 shows a flow chart for binding an I/O Object by a NUMA I/O Framework in accordance with one or more embodiments of the invention. In one or more embodiments of the invention, one or more of the steps shown in FIG. 12 may be omitted, repeated, and/or performed in a different order than that shown in FIG. 12. Accordingly, the specific arrangement of steps shown in FIG. 12 should not be construed as limiting the scope of the invention.

In Step 1210, the NUMA I/O Framework receives a request to bind an I/O Object Group to a NUMA Node Set. In Step 1212, the NUMA I/O Framework obtains the I/O Object affinities for each I/O Object in the I/O Object Group. In one embodiment of the invention, an affinity is presumed between all I/O Objects in an I/O Object Group. In Step 1214, the NUMA I/O Framework determines I/O Object Group constraints. In one embodiment of the invention, the affinities and constraints are imbedded in the received I/O Object. In Step 1216, the NUMA I/O Framework obtains the I/O Object Group Aggregate Load from the Load Balancing Module.

In Step 1218, the NUMA I/O Framework determines Node Selection Requirements using the information about the I/O Object affinities and constraints, along with any other restrictions or indications obtained regarding the I/O Objects (including the existence of a Dedicate CPU Flag). In one embodiment of the invention, the Node Selection Requirements specify a set of conditions that a node or set of nodes must satisfy to be considered for binding the I/O Object Group. Such conditions may include a specific arrangement of nodes within a set distance from an I/O Device. In one embodiment of the invention, the conditions may include the I/O load capacity of a selected node.

In one embodiment of the invention, the Node Selection Requirements may only be satisfied by more than one node. For example, if one I/O Object in an I/O Object Group has a Dedicate CPU Flag, and no other object in the I/O Object Group may be placed on the same node, the Node Selection Requirements would necessarily require the use of more than one node. Therefore, the Node Selection Requirements may necessitate the I/O Object Group be bound to a node or combination of nodes, both of which may be referred to as a node set or set of nodes. Consequently, a node set may consist of a single node or a combination of nodes.

In one embodiment of the invention, the Node Selection Requirements for an I/O Object Group persist as long as that I/O Object Group exists. In one embodiment of the invention, the I/O load on the nodes of the system may differ such that the NUMA I/O Framework rebinds the I/O Object Group to a different node set. In such a circumstance, the node set to which the I/O Object Group is moved must also satisfy the same Node Selection Requirements.

In Step 1220, the NUMA I/O Framework uses the Load Balancing Module to determine a Primary Preferred NUMA Node Set. Specifically, the NUMA I/O Framework queries the Load Balancing Module to determine a set of nodes with an I/O load capacity at least equivalent to the I/O Object Group Aggregate Load. In one embodiment of the invention, the NUMA I/O Framework may also query the I/O Topology module to determine which of the node or nodes with the requisite I/O load capacity are closest to the I/O Device. In one embodiment of the invention, the Primary Preferred NUMA Node Sets are the node sets closest to the I/O Device that include requisite I/O load capacity. Alternatively, NUMA I/O Framework may determine the Primary Preferred NUMA Node Sets are the node sets with the highest I/O load capacity above the requisite I/O load capacity. In one embodiment of the invention, the Primary Preferred NUMA Node Sets are determined using a combination of these factors.

In Step 1222, the NUMA I/O Framework determines whether there is more than one Primary Preferred NUMA Node Set upon which the I/O Objects in the I/O Object Group may be bound. Specifically, the NUMA I/O Framework determines whether any of the Primary Preferred NUMA Node Sets satisfies the Node Selection Requirements (i.e., is available).

If there is more than one available Primary Preferred NUMA Node Set, then in Step 1224, one of the Primary Preferred NUMA Node Sets is selected based on a selection policy. In one embodiment of the invention, when there are two nodes or sets of nodes which may both equally satisfy the Node Selection Requirements, one of the satisfactory Primary Preferred NUMA Node Sets is selected according to the selection policy. In one embodiment of the invention, the selection policy dictates that the node set with the highest I/O load capacity is selected (if a variation exists). In one embodiment of the invention, the selection policy dictates that the node set closest to the I/O Device is selected (if a variation exists). In one embodiment of the invention, the selection policy specifies that one Primary Preferred NUMA Node Set is selected at random. Alternatively, the selection policy may further other system goals independent of the system goals used to determine the Primary Preferred NUMA Node Sets.

If there is not more than one Primary Preferred NUMA Node Sets available, then in Step 1226, the NUMA I/O Framework determines whether there is one Primary Preferred NUMA Node Set that satisfies the Node Selection Requirements. If there is one Primary Preferred NUMA Node Set, then in Step 1228, that Primary Preferred NUMA Node Set is selected.

If there is no Primary Preferred NUMA Node Set, then in Step 1230, the NUMA I/O Framework determines a Secondary Preferred NUMA Node Set. Specifically, the NUMA I/O Framework queries the Load Balancing Module to obtain a set of nodes with an I/O load capacity at least equivalent to the I/O Object Group Aggregate Load. From this list of nodes, the Primary Preferred Node Sets are marked as unavailable. The Secondary Preferred Node Sets are determined from the list of remaining nodes.

In one embodiment of the invention, the Secondary Preferred NUMA Node Sets are the node sets from the list of remaining nodes closest to the I/O Device that include the requisite I/O load capacity. In one embodiment of the invention, the NUMA I/O Framework may query the Locality Group Module to determine the node or nodes directly connected to the nodes closest to the I/O Device. Alternatively, NUMA I/O Framework may determine the Secondary Preferred NUMA Node Sets from the list of remaining nodes are the node sets with the highest I/O load capacity above the requisite I/O load capacity. In one embodiment of the invention, the Secondary Preferred NUMA Node Sets are determined from the list of remaining nodes using a combination of these factors. In one embodiment of the invention, if there are no Primary Preferred NUMA Node Sets available, then the system waits until one of the initially determined Primary Preferred NUMA Node Sets becomes available. In addition, if no Primary Preferred NUMA Node Sets are available, the NUMA I/O Framework may bind the I/O Object Group to a node set which does not satisfy all of the Node Selection Requirements. For example, if one I/O Object in the I/O Object Group includes a Dedicate CPU Flag, the NUMA I/O Framework may determine that all I/O Objects in the I/O Object Group may be bound to the same node, despite the existence of the Dedicate CPU Flag.

In Step 1232, the Secondary Preferred NUMA Node Set is promoted to the Primary Preferred NUMA Node Set, and the flow returns to Step 1222. Once a Primary Preferred NUMA Node Set is selected, then in Step 1234, the I/O Object or I/O Objects in the I/O Object Group is bound to the selected Primary Preferred NUMA Node Set.

Figure 13:
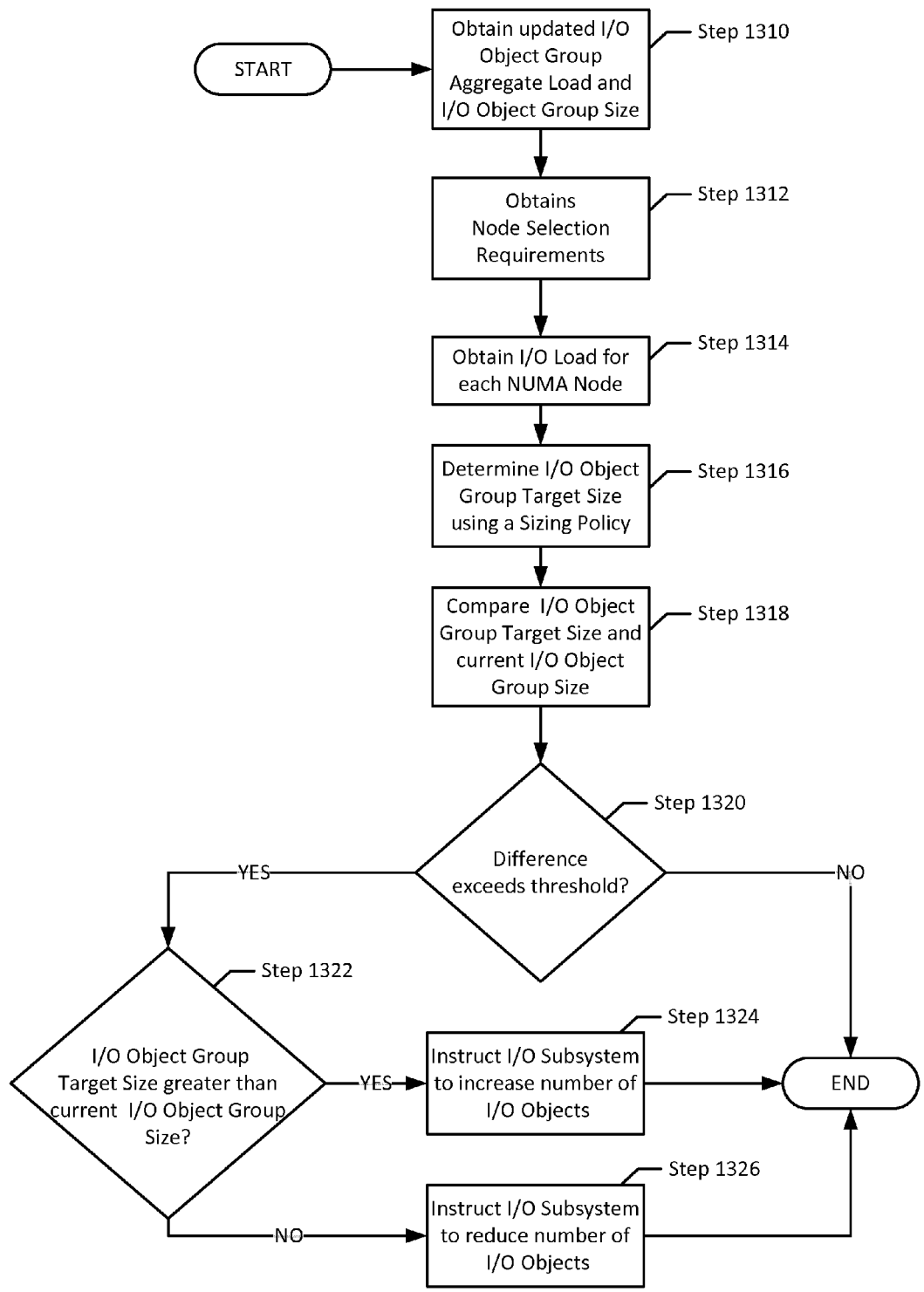
FIG. 13 shows a flowchart in accordance with one or more embodiments of the invention.

FIG. 13 shows a flow chart for resizing an I/O Object Group in accordance with one or more embodiments of the invention. In one or more embodiments of the invention, one or more of the steps shown in FIG. 13 may be omitted, repeated, and/or performed in a different order than that shown in FIG. 13. Accordingly, the specific arrangement of steps shown in FIG. 13 should not be construed as limiting the scope of the invention.

In Step 1310, the NUMA I/O Framework obtains an updated I/O Object Group Aggregate Load from the Load Balancing Module. The updated I/O Object Group Aggregate Load may include, for example, a more recent measurement of the I/O load imposed by each I/O Object on the node to which it is bound, and a recalculation of the I/O Object Group Aggregate Load. The NUMA I/O Framework also determines the I/O Object Group Size (i.e., the number of I/O Objects in the I/O Object Group).

In Step 1312, the NUMA I/O Framework determines the Node Selection Requirements using the information about the I/O Object affinities and constraints, along with any other restrictions or indications obtained regarding the I/O Objects (including the existence of a Dedicate CPU Flag). In Step 1314, the NUMA I/O Framework queries the Load Balancing Module to obtain updated system I/O load measurements for each node on the system. In one embodiment of the invention, this updated I/O load measurement includes the I/O load capacity and resource utilization for each node on the system.

In Step 1316, the NUMA I/O Framework applies a Sizing Policy to the I/O Object Group Aggregate Load, the Node Selection Requirements, and system I/O load measurements to determine the I/O Object Target Size. In one embodiment of the invention, the Sizing Policy dictates how many I/O Objects each I/O Object Group should include (i.e., I/O Object Group Target Size). For example, the Sizing Policy may specify that the I/O Object Group Target Size is calculated such that a certain ratio between the I/O Object Group Aggregate Load and the I/O Object Group Target Size is maintained. Further, the Sizing Policy may specify a calculation of the I/O Object Group Target Size dependent upon the Node Selection Requirements, and system I/O load measurements. In one embodiment of the invention, the Sizing Policy may also account for the type of I/O Subsystem associated with the I/O Object Group, and may give priority to one I/O Object Group over another. In one or more embodiments of the invention, the I/O Object Group Target Size is calculated in terms of the number of resources associated with an I/O Object group, rather than the number of I/O Objects within the I/O Object Group.

In Step 1318, the NUMA I/O Framework compares the current I/O Object Group Size to the I/O Object Target Size. In Step 1320, the NUMA I/O Framework determines if the difference between the current I/O Object Group Size and the I/O Object Target Size exceeds a threshold. In one embodiment of the invention, the threshold is a quantification of the maximum tolerated difference between the I/O Object Group Size and the I/O Object Target Size. In one embodiment of the invention, the threshold may be set to avoid changing the size of an I/O Object Group at an inefficient rate (i.e., so frequently as to needlessly waste resources). In one embodiment of the invention, a different threshold may be used depending on the attributes of the I/O Object Group (e.g., the associated I/O Subsystem, type of I/O resources corresponding to the I/O Objects, etc.). In one embodiment of the invention, the threshold may account for an expected volatility in the I/O Object Group Aggregate Load over time, and apply a lenient threshold in response to this expectation.

If in Step 1320, the NUMA I/O Framework determines that the threshold has not been exceeded, the flow ends. If in Step 1320, the NUMA I/O Framework determines that the threshold has been exceeded, then the NUMA I/O Framework determines whether the I/O Object Group Target Size is greater than the current I/O Object Group Size. If the I/O Object Group Target Size is greater than the current I/O Object Group Size, then in Step 1324, the NUMA I/O Framework instructs the associated I/O Subsystem to increase the number of I/O Objects in the I/O Object Group to the I/O Object Group Target Size. In one embodiment of the invention, increasing the number of I/O Objects in an I/O Object Group may include initializing an additional I/O Object, and adding it to the I/O Object Group. If, however, the I/O Object Group Target Size is not greater than the current I/O Object Group Size, then in Step 1326, the NUMA I/O Framework instructs the associated I/O Subsystem to decrease the number of I/O Objects in the I/O Object Group to the I/O Object Group Target Size. In one embodiment of the invention, decreasing the number of I/O Objects in an I/O Object Group may include removing an I/O Object from an I/O Object Group and releasing the reference to the resource associated with that I/O Object. In one or more embodiments of the invention, the NUMA I/O Framework instructs the I/O Subsystem to change the number of I/O resources associated with an I/O Object Group. In one embodiment of the invention, the I/O Subsystem determines how to change the number of I/O Objects in the I/O Object Group to satisfy the NUMA I/O Framework instruction.

Figure 14A:
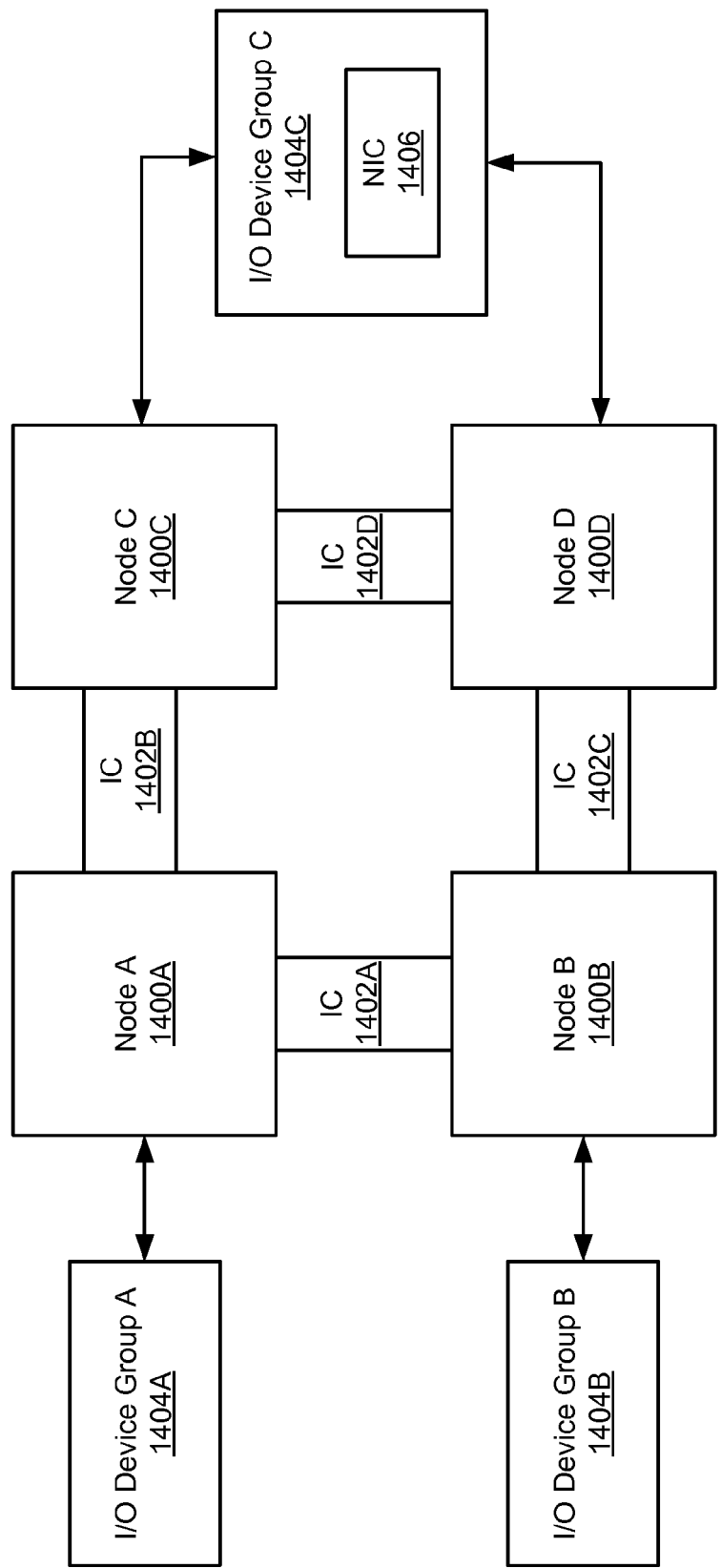
FIG. 14A shows an example system in accordance with one or more embodiments of the invention.
Figure 14B:
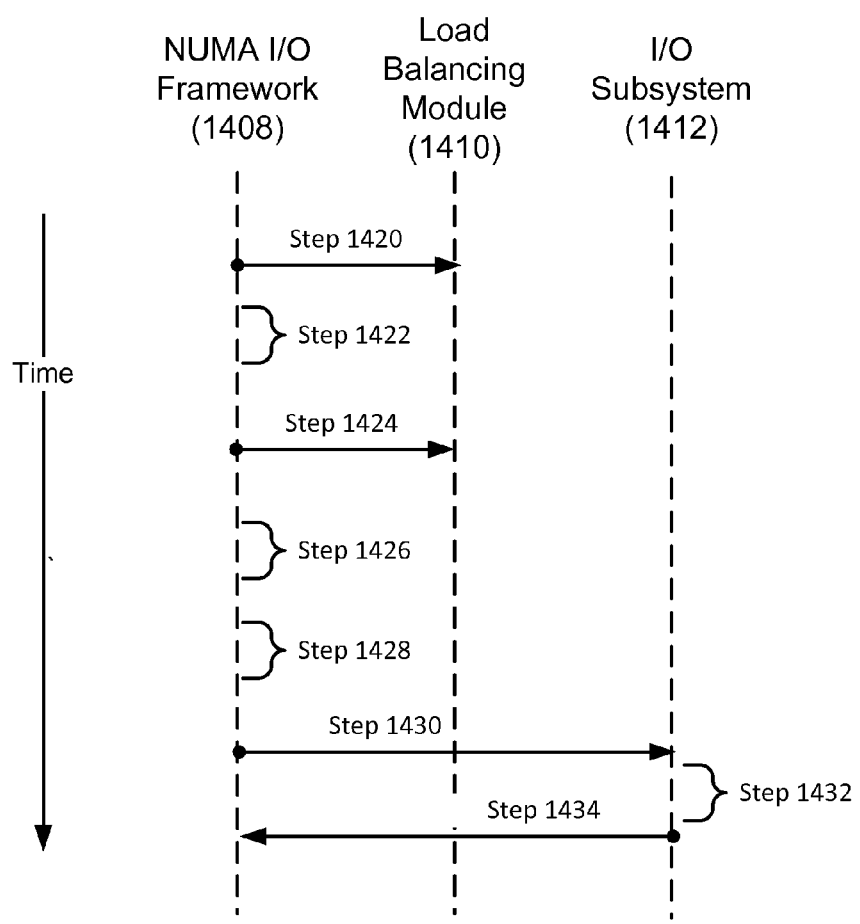
FIG. 14B shows an example timeline in accordance with one or more embodiments of the invention.
Figure 15:
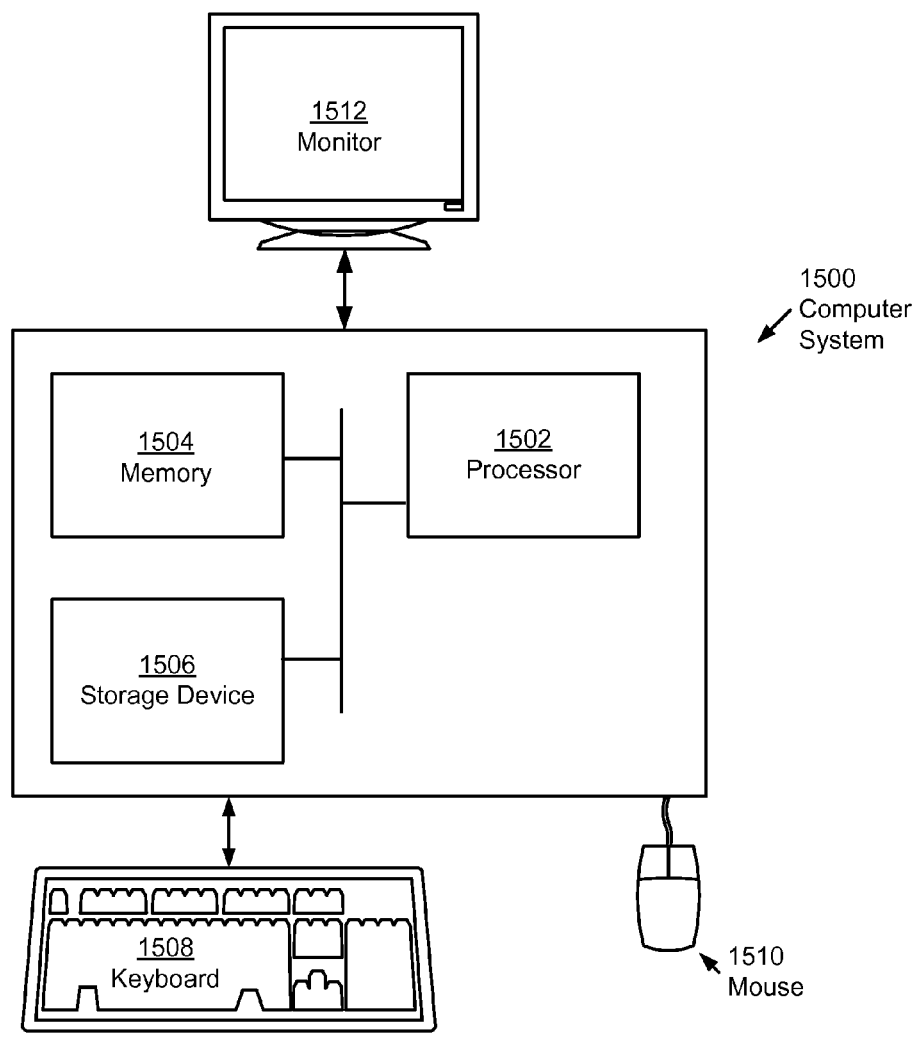
FIG. 15 shows a system in accordance with one or more embodiments of the invention.

FIGS. 14A and 14B show an exemplary system and timeline in accordance with one embodiment of the invention. As shown in FIG. 14A, the system includes Node A (1400A), Node B (1400B), Node C (1400C), and Node D (1400D). Node A (1400A) is connected to Node B (1400B) via IC A (1402A), and to Node C (1400C) via IC B (1402B). Node B (1400B) is connected to Node A (1400A) via IC A (1402A), and to Node D (1400D) via IC C (1402C). Node C (1400C) is connected to Node A (1400A) via IC B (1402B), and to Node D (1400D) via IC D (1402D). Node D (1400D) is connected to Node B (1400B) via IC C (1402C), and to Node C (1400C) via IC D (1402D).

Continuing with the discussion of FIG. 14A, Node A (1400A) is operatively connected to I/O Device Group A (1404A), and Node B (1400B) is operatively connected to I/O Device Group B (1404B). Additionally, Node C (1400C) and Node D (1400D) are both operatively connected to I/O Device C (1404C). I/O Device C (1404C) includes a physical network interface card (NIC) (1406).

FIG. 14B shows an timeline of an exemplary interaction between the elements in FIG. 14A. For the purposes of the example, assume that an I/O Object Group is bound to a node set made up of Node A (1400A) and Node B (1400B). Suppose that the I/O Object Group is made up of three I/O Objects (i.e., the I/O Object Group Size is three): I/O Object X, I/O Object Y, and I/O Object Z. Assume further that I/O Object X is bound to Node A (1400A), and that I/O Object Y and I/O Object Z are bound to Node B (1400B). Assume also that the NUMA I/O Framework uses a Sizing Policy stating that a ratio of 1:3 should be maintained between the I/O Object Group Target Size and the I/O Object Group Aggregate Load. Finally, assume that the NUMA I/O Framework uses a threshold which is exceeded by any difference between the I/O Object Group Target Size and the current I/O Object Group Size.

In Step 1420, the NUMA I/O Framework (1408) queries the Load Balancing Module to obtain an updated I/O Object Group Aggregate Load from the Load Balancing Module. For the purposes of the example, assume that I/O Object X has a current effective I/O Load of 7, I/O Object Y has a current effective I/O Load of 6, and I/O Object Z has a current effective I/O Load of 5. The updated I/O Object Group Aggregate Load, therefore, would be determined to be 18.

In Step 1422, the NUMA I/O Framework (1408) determines the Node Selection Requirements using the information about I/O Object X, I/O Object Y, and I/O Object Z. For the purposes of the example, assume that the Node Selection Requirements dictate that the I/O Object Group may be bound to a node set of either one node or two directly connected nodes. In Step 1424, the NUMA I/O Framework (1408) queries the Load Balancing Module (1410) to obtain updated system I/O load measurements for each node on the system.

In Step 1426, the NUMA I/O Framework (1408) applies the Sizing Policy to the I/O Object Group Aggregate Load of 18 and the Node Selection Requirements (note that the example Sizing Policy does not account for the system I/O load). Because the I/O Object Group Aggregate Load is 18, the I/O Object Target Size is calculated to be 6 in order to maintain the ratio of 1:3 between the I/O Object Group Target Size and the I/O Object Group Aggregate Load. In Step 1428, the I/O Object Target Size of 6 is compared to the current I/O Object Size of 3. In Step 1428, the NUMA I/O Framework determines that the difference between the I/O Object Target Size and the current I/O Object Size exceeds the threshold of 0, and that the I/O Object Target Size of 6 is greater than the current I/O Object Size of 3. In Step 1430, the NUMA I/O Framework (1408) instructs the I/O Subsystem (1412) to increase the size of the I/O Object Group from 3 to 6 I/O Objects. In Step 1432, the I/O Subsystem (1412) creates the new I/O Objects. In Step 1434, the I/O Subsystem (1412) passes the new I/O Objects to the NUMA I/O Framework (1408) to be bound to a node set.

In one or more embodiments of the invention, increasing the size of I/O Object Groups according to the load ensures that resources are allocated according to need and usage. Reducing the resources allocated to an I/O Object Group avoids the occurrence of overlapping objects, which may compete for CPU cycles and thereby reduce the overall system efficiency. Further, in one or more embodiments of the invention may ensure that limited hardware resources (e.g., hardware rings) are allocated to I/O Object Groups for efficient use of those resource, and to avoid over- or under-utilization.

Embodiments of the invention may be implemented on virtually any type of computer implementing a NUMA architecture (1500) (or equivalent). For example, a networked computer system including two or more processors (1502), associated memory (1504), a storage device (1506), two or more I/O devices (not shown) and numerous other elements and functionalities typical of today's computers. The networked computer may also include input means, such as a keyboard (1508) and a mouse (1510), and output means, such as a monitor (1512). The networked computer system is connected to a local area network (LAN) or a wide area network via a network interface connection. Those skilled in the art will appreciate that these input and output means may take other forms. Further, those skilled in the art will appreciate that one or more elements of the aforementioned computer may be remotely located and connected to the other elements over a network. Further, software instructions to perform embodiments of the invention may be stored on a non-transitory computer readable storage medium such as a compact disc (CD), a diskette, a tape, a physical disk, or any other non-transitory computer readable storage medium.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions, which when executed by a processor perform a method, the method comprising:
   binding, by a Non-Uniform Memory Access (NUMA) input/output (I/O) Framework, an I/O object group to a NUMA node of a plurality of NUMA nodes on a system, wherein the I/O object group is a group of references to I/O resources necessary to service requests to access an I/O device, and wherein the I/O object group comprises a first I/O object corresponding to a first thread and a second I/O object corresponding to an interrupt;
   obtaining an I/O object group size of the I/O object group bound to the NUMA node, wherein the I/O object group size is a value corresponding to a number of I/O objects within the I/O object group;
   determining an I/O object group target size based on an I/O object group aggregate load of the I/O object group wherein the I/O object group target size is calculated using a sizing policy and wherein the I/O object group aggregate load is calculated using a value corresponding to an amount of processing resources necessary to process the I/O object group;
   comparing, by the NUMA I/O Framework, the I/O object group target size and the I/O object group size;
   determining, by the NUMA I/O Framework, that a difference between the I/O object group target size and the I/O object group size exceeds a threshold; and
   instructing, by the NUMA I/O Framework, an I/O Subsystem associated with the I/O object group to change the I/O object group size, wherein the I/O Subsystem changes, in response to the instruction, a number of the references to the I/O resources necessary to service requests to access the I/O device, wherein after the changing, the I/O object group size is equal to the I/O object group target size.

2. The non-transitory computer readable medium of claim 1, wherein the first I/O object comprises an affinity defining a relationship between the first I/O object and the second I/O object.

3. The non-transitory computer readable medium of claim 1, wherein the determination that the difference between the I/O object group target size and the I/O object group size exceeds the threshold indicates the NUMA node processing the I/O object group is one selected from a group consisting of under-utilized and over-utilized.

4. The non-transitory computer readable medium of claim 1, wherein the changing the I/O object group size comprises one selected from a group consisting of adding an I/O object to the I/O object group, removing the I/O object from the I/O object group, and releasing a reference to a resource corresponding to the I/O object.

5. The non-transitory computer readable medium of claim 1, wherein the sizing policy specifies that the I/O object group target size is calculated as a particular ratio of the I/O object group aggregate load.

6. A system, comprising:
   an input/output (I/O) device;
   a plurality of Non-Uniform Memory Access (NUMA) nodes comprising:
   a NUMA node comprising a processor and a memory;
   a NUMA I/O Framework executing on at least one of the plurality of NUMA nodes, configured to:
   bind an I/O object group to the NUMA node, wherein the I/O object group is a group of references to I/O resources necessary to service requests to access the I/O device, and wherein the I/O object group comprises a first I/O object corresponding to a first thread and a second I/O object corresponding to an interrupt;
   obtain an I/O object group size of the I/O object group bound to the NUMA node, wherein the I/O object group size is a value corresponding to a number of I/O objects within the I/O object group;
   determine an I/O object group target size based on an I/O object group aggregate load of the I/O object group, wherein the I/O object group target size is calculated using a sizing policy and wherein the I/O object group aggregate load is calculated using a value corresponding to an amount of processing resources necessary to process the I/O object group;
   compare the I/O object group target size and the I/O object group size;

send the I/O object group target size to an I/O Subsystem associated with the I/O object group in response to a determination that a difference between the I/O object group target size and the I/O object group size exceeds a threshold; and instruct the I/O Subsystem to change the I/O object group size using the I/O object group target size; and the I/O Subsystem executing on at least one of the plurality of NUMA nodes, configured to:

receive the I/O object group target size;

receive the instruction to change the I/O object group size; and change the I/O object group size using the I/O object group target size by changing a number of the references to the I/O resources necessary to service requests to access the I/O device, wherein after the changing, the I/O object group size is equal to the I/O object group target size.

7. The system of claim 6, wherein the first I/O object comprises an affinity defining a relationship between the first I/O object and the second I/O object.

8. The system of claim 7, wherein changing the I/O object group size comprises:

initializing a third I/O object;

adding the third I/O object to the I/O object group; and sending a request to the NUMA I/O Framework to bind the third I/O object to one of the plurality of NUMA nodes on the system.

9. The system of claim 7, wherein changing the I/O object group size comprises:

selecting the first I/O object;

removing the first I/O object from the I/O object group; and releasing a reference to a resource corresponding to the first I/O object.

10. The system of claim 6, wherein the determination that the difference between the I/O object group target size and the I/O object group size exceeds the threshold indicates the NUMA node is one selected from a group consisting of under-utilized and over-utilized.

11. The system of claim 6, wherein the sizing policy specifies that the I/O object group target size is calculated as a particular ratio of the I/O object group aggregate load.

12. A method for binding input/output (I/O) objects to nodes, the method comprising:

binding, by a Non-Uniform Memory Access (NUMA) input/output (I/O) Framework, an I/O object group to a NUMA node of a plurality of NUMA nodes on a system, wherein the I/O object group is a group of references to I/O resources necessary to service requests to access an I/O device, and wherein the I/O object group comprises a first I/O object corresponding to a first thread and a second I/O object corresponding to an interrupt;

obtaining an I/O object group size of the I/O object group bound to the NUMA node, wherein the I/O object group size is a value corresponding to a number of I/O objects within the I/O object group;

determining an I/O object group target size based on a first I/O object effective load of the first I/O object and a second I/O object effective load of the second I/O object, wherein the I/O object group target size is calculated using a sizing policy, and wherein the first and second I/O object effective loads are calculated using a value corresponding to an amount of processing resources necessary to process the I/O object group;

comparing, by the NUMA I/O Framework, the I/O object group target size and the I/O object group size;

determining, by the NUMA I/O Framework, that a difference between the I/O object group target size and the I/O object group size exceeds a threshold; and instructing, by the NUMA I/O Framework, a Network Media Access Connection (MAC) Layer associated with the I/O object group to change the I/O object group size, wherein the Network MAC Layer changes, in response to the instruction, a number of the references to the I/O resources necessary to service requests to access the I/O device, wherein after the changing, the I/O object group size is equal to the I/O object group target size.

13. The method of claim 12, wherein changing the I/O object group size comprises:

initializing, by the Network MAC Layer, a third I/O object corresponding to a second thread;

adding the third I/O object to the I/O object group; and sending a request to the NUMA I/O Framework to bind the third I/O object to one of the plurality of NUMA nodes on the system.

14. The method of claim 12, wherein changing the I/O object group size comprises:

selecting, by the Network MAC Layer, the first I/O object;

removing, by the Network MAC Layer, the first I/O object from the I/O object group; and releasing, by the Network MAC Layer, a reference to a resource corresponding to the first I/O object.

15. The method of claim 12, wherein the I/O object group is associated with a virtual network interface card executing on one of the plurality of NUMA nodes.

16. The method of claim 12, wherein the determination that the difference between the I/O object group target size and the I/O object group size exceeds the threshold comprises determining that the first I/O object corresponding to the first thread is contributing to an under-utilization of the NUMA node.

17. The method of claim 12, wherein the sizing policy specifies that the I/O object group target size is calculated as a particular ratio of the I/O object group aggregate load.

* * * * *